(12) United States Patent
Ueda et al.

(10) Patent No.: US 8,399,144 B2
(45) Date of Patent: Mar. 19, 2013

(54) MEMBRANE-ELECTRODE ASSEMBLY FOR DIRECT OXIDATION FUEL CELL AND DIRECT OXIDATION FUEL CELL

(75) Inventors: Hideyuki Ueda, Osaka (JP); Hiroaki Matsuda, Osaka (JP); Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 12/336,149

(22) Filed: Dec. 16, 2008

(65) Prior Publication Data

US 2009/0169948 A1 Jul. 2, 2009

(30) Foreign Application Priority Data

Dec. 28, 2007 (JP) ................................. 2007-339031

(51) Int. Cl.
H01M 8/10 (2006.01)
(52) U.S. Cl. ................. 429/480; 429/483; 429/534
(58) Field of Classification Search ........................ None
See application file for complete search history.

(56) References Cited

U.S. PATENT DOCUMENTS

| 7,754,369 | B2 * | 7/2010 | Starz et al. | 429/524 |
| 2007/0122684 | A1 * | 5/2007 | Song | 429/40 |
| 2007/0254207 | A1 * | 11/2007 | Shin et al. | 429/42 |

FOREIGN PATENT DOCUMENTS

| JP | 2005-183368 | 7/2005 |
| JP | 2005-353541 | 12/2005 |
| JP | 2006-107877 | 4/2006 |

* cited by examiner

Primary Examiner — John S Maples
(74) Attorney, Agent, or Firm — McDermott Will & Emery LLP

(57) ABSTRACT

A membrane-electrode assembly for a direct oxidation fuel cell includes an electrolyte membrane, and an anode and a cathode sandwiching said electrolyte membrane. The cathode includes a catalyst layer in contact with the electrolyte membrane and a diffusion layer formed on the catalyst layer, and the catalyst layer contains 2 to 20% by volume of pores. A direct oxidation fuel cell including this membrane-electrode assembly has excellent power generating performance and durability.

4 Claims, 5 Drawing Sheets

MEMBRANE-ELECTRODE ASSEMBLY FOR DIRECT OXIDATION FUEL CELL AND DIRECT OXIDATION FUEL CELL

RELATED APPLICATIONS

This application claims priority to Japanese Application No. 2007-339031, filed on Dec. 28, 2007 the disclosure of which Application is incorporated by reference herein.

FIELD OF THE INVENTION

The invention relates to a membrane-electrode assembly for a direct oxidation fuel cell and a direct oxidation fuel cell. More particularly, the invention relates to an improvement in the electrode of a direct oxidation fuel cell which directly uses a fuel without reforming it into hydrogen.

BACKGROUND OF THE INVENTION

With the advancement of ubiquitous network society, there is a rapid increase in the demand for mobile devices such as cellular phones, notebook personal computers, and digital still cameras. As the power source for such mobile devices, it is desired to put fuel cells into practical use as early as possible since fuel cells do not have to be recharged and can continuously supply power to devices if only they get refueled.

Among fuel cells, direct oxidation fuel cells are receiving attention and studied and developed actively. Direct oxidation fuel cells generate power by using an organic fuel such as methanol or dimethyl ether, but the organic fuel is not reformed into hydrogen and is supplied directly to the anode for oxidation. The organic fuels used for direct oxidation fuel cells have high theoretical energy densities, permit easy system simplification, and can be stored easily.

A typical direct oxidation fuel cell is formed by stacking a plurality of unit cells each of which is composed of an MEA (membrane-electrode assembly) sandwiched between two separators. The MEA comprises a solid polymer electrolyte membrane having an anode or a cathode bonded to either side, and each of the anode and the cathode is composed of a catalyst layer and a diffusion layer. Each of the two separators has a flow channel, through which a fuel and water are supplied to the anode side and an oxidant is supplied to the cathode side to generate power.

The power generation process of direct oxidation fuel cells are specifically described below. For example, the electrode reactions of a direct methanol fuel cell (hereinafter referred to as a DMFC), which uses methanol as the fuel, are as follows.

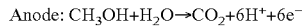

Anode: $CH_3OH + H_2O \rightarrow CO_2 + 6H^+ + 6e^-$

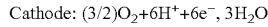

Cathode: $(3/2)O_2 + 6H^+ + 6e^-, 3H_2O$

As shown above, at the anode, methanol reacts with water to produce carbon dioxide, protons, and electrons. The protons produced at the anode move to the cathode through the electrolyte membrane, and the electrons produced at the anode move to the cathode through an external circuit. At the cathode, the protons and electrons from the anode combine with oxygen to form water.

However, practical utilization of DMFCs has some problems. One of the problems relates to the problem of durability. In particular, initial deterioration of the power generating performance of DMFCs is a large problem.

The main cause of the initial deterioration of power generating performance of DMFCs is accumulation of water inside the cathode catalyst layer or at the interface between the cathode catalyst layer and the diffusion layer. The water accumulation occurs due to condensation of water produced by the reaction and water having moved from the anode with the passage of power generation time. The water accumulation due to condensation at the aforementioned interface decreases the diffusibility of oxygen and increases the cathode-side concentration overvoltage.

Further, this initial deterioration is strongly affected by methanol crossover (hereinafter referred to as MCO), which is a phenomenon in which unreacted methanol crosses through the electrolyte membrane to the cathode. This is specifically described. At the cathode catalyst layer, due to MCO, the oxidation reaction of methanol occurs together with the reduction reaction of oxygen, which is the normal electrode reaction of the cathode. Thus, when high concentration methanol is used as the fuel, an increase in the amount of MCO with the passage of power generation time causes a significant increase in cathode activation overvoltage. In addition, carbon dioxide produced by the oxidation reaction of methanol further lowers the diffusibility of oxygen. As a result, the power generation performance deteriorates significantly.

The above-described cause of the initial deterioration can be removed by supplying a large amount of air to the cathode. However, such an approach is not preferable because the use of an air pump, blower or the like in a fuel cell for supplying a large amount of air to the cathode requires more electric power for operation and upsizing of the equipment. In addition, if the amount of air supplied is excessive, the electrolyte membrane and the polymer electrolyte in the catalyst layer in the unit cell dry up, which lowers the proton conductivity. As a result, the power generating performance deteriorates significantly.

To remove the cause of the initial deterioration without causing such adverse effects, a large number of proposals have been made to improve the structure of the cathode catalyst layer itself.

For example, Japanese Laid-Open Patent Publications No. 2005-353541 and No. 2006-107877 propose providing a cathode catalyst layer with a plurality of through-holes or vertical holes so that oxygen can be smoothly supplied deep into the catalyst layer and water can be smoothly removed from the depths of the catalyst layer even when the catalyst layer is thick.

Japanese Laid-Open Patent Publication No. 2005-183368 proposes an anode catalyst layer and a cathode catalyst layer both having a thickness of 20 μm or more, wherein at least one of the catalyst layers has pores with sizes of 0.3 to 2.0 μm and the volume of these pores is equal to or greater than 4% of the volume of all the pores. In this case, a liquid fuel and air (oxygen) can easily reach the respective reaction sites inside the electrodes without lowering electronic conductivity and proton conductivity.

However, according to the aforementioned conventional techniques, it is difficult to obtain a catalyst layer with a small cathode overvoltage which allows condensed water accumulated inside the cathode catalyst layer or at the interface between the cathode catalyst layer and the diffusion layer to be efficiently removed so that oxygen diffusibility is secured for an extended period of time.

Specifically, according to the conventional techniques of Japanese Laid-Open Patent Publications No. 2005-353541 and No. 2006-107877, in an early stage of power generation in which the amount of condensed water on the cathode side is small, oxygen easily reaches the three-phase interface (electrode reaction site) through the through-holes or vertical holes present in the catalyst layer. The power generating performance thus becomes relatively good. However, with the passage of power generation time, condensed water is gradually accumulated in the through-holes or vertical holes. It is thus difficult to ensure that oxygen is supplied deep into the catalyst layer. As a result, the power generating performance sharply lowers at a certain point.

Also, the conventional technique of Japanese Laid-Open Patent Publication No. 2005-183368 merely defines the lower limit value of the thickness of the catalyst layers, the pore size, and the pore volume. It is thus difficult to say that the whole catalyst layer has an optimum pore structure in terms of all of the diffusibility of fuel and air, the removal of carbon dioxide and water which are the reaction products, electronic conductivity, and proton conductivity.

The invention has been conceived in view of the problems as described above. It is therefore an object of the invention is to provide a membrane-electrode assembly for a direct oxidation fuel cell having excellent power generating performance and durability and such a direct oxidation fuel cell, having a cathode catalyst layer with a small overvoltage which allows condensed water accumulated inside the cathode catalyst layer or at the interface between the cathode catalyst layer and the diffusion layer to be efficiently removed so that oxygen diffusibility is secured for an extended period of time.

BRIEF SUMMARY OF THE INVENTION

In order to achieve the aforementioned objects, the invention is directed to a membrane-electrode assembly for a direct oxidation fuel cell, including an electrolyte membrane, and an anode and a cathode sandwiching said electrolyte membrane. The cathode includes a catalyst layer in contact with the electrolyte membrane and a diffusion layer sandwiching the catalyst layer with the electrolyte membrane. The amount of pores present in the catalyst layer, at the interface between the electrolyte membrane and the catalyst layer, and at the interface between the diffusion layer and the catalyst layer is 2 to 20% of the total volume of the portion between the electrolyte membrane and the diffusion layer.

In a preferable mode of the invention, the greatest depth of the pores present at the interface between the diffusion layer and the catalyst layer from the aforementioned interface is equal to or less than 50% of the thickness of the catalyst layer.

In another preferable mode of the invention, the greatest width of the pores in the direction parallel to the interface between the catalyst layer and the electrolyte membrane is equal to or less than the thickness of the electrolyte membrane.

In a still another preferable mode of the invention, the thickness of the catalyst layer is 20 to 70 µm.

Also, in a preferable mode of the invention, the amount of a catalyst in the catalyst layer per projected unit area is 0.6 to 1.6 mg/cm$^2$.

The invention also relates to a direct oxidation fuel cell including at least one unit cell, the unit cell including: the above-described membrane-electrode assembly; an anode-side separator having a fuel flow channel for supplying a fuel to the anode; and a cathode-side separator having an oxidant flow channel for supplying an oxidant to the cathode.

The invention can provide a cathode catalyst layer with a small overvoltage which allows condensed water accumulated inside the cathode catalyst layer or at the interface between the cathode catalyst layer and the diffusion layer to be efficiently removed so that oxygen diffusibility is secured for an extended period of time. It is thus possible to provide a direct oxidation fuel cell having excellent power generating performance and durability.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
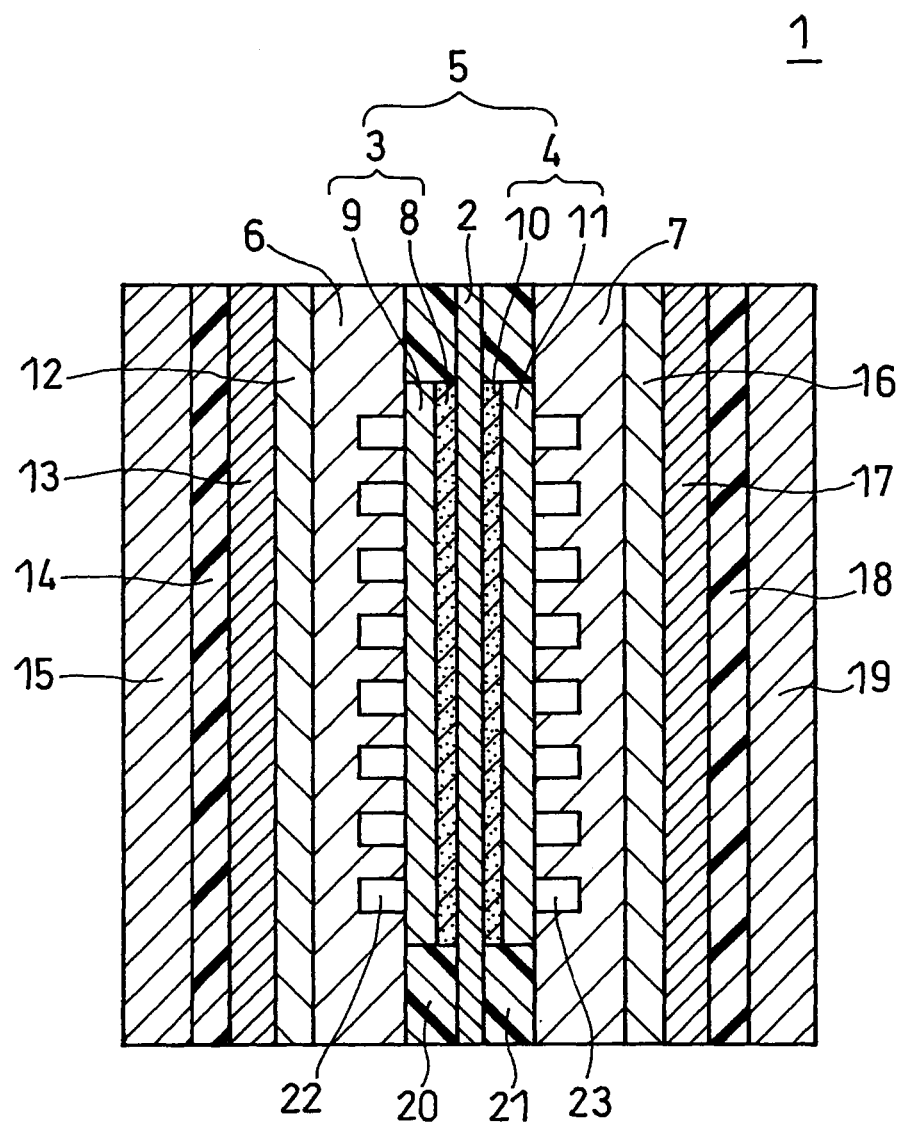
FIG. 1 is a longitudinal sectional view schematically showing the structure of a unit cell including a membrane-electrode assembly for a direct oxidation fuel cell according to Embodiment 1 of the invention.

The invention relates to a membrane-electrode assembly for a direct oxidation fuel cell, including an electrolyte membrane, an anode bonded to one face of the electrolyte membrane, and a cathode bonded to the other face of the electrolyte membrane. The cathode includes a catalyst layer in contact with the electrolyte membrane and a diffusion layer sandwiching the catalyst layer with the electrolyte membrane. The amount of pores present in the catalyst layer, at the interface between the electrolyte membrane and the catalyst layer, and at the interface between the diffusion layer and the catalyst layer is 2 to 20% of the total volume of the portion between the electrolyte membrane and the diffusion layer.

With the above-configuration, the defect of the cathode catalyst layer is reduced, and the evenness of the electrode reaction can be enhanced over the whole region of the catalyst layer. Further, condensed water is mainly accumulated in the pores inside the catalyst layer (gaps between the secondary particles of the catalyst) and the pores present at the interface between the electrolyte membrane and the catalyst layer and the interface between the diffusion layer and the catalyst layer. In the invention, the ratio of these pores to the total volume of the catalyst layer (total volume of the portion between the electrolyte membrane and the diffusion layer) (this ratio is hereinafter referred to as "porosity") is 20% at the maximum, which is low compared with conventional 25 to 45%. Hence, a large amount of condensed water is not accumulated.

Thus, the pressure exerted on the condensed water quickly rises to a pressure necessary for discharging the condensed water into the oxidant flow channel of the separator through the pores of the diffusion layer. As a result, the condensed water accumulated in the pores is discharged into the oxidant flow channel at short intervals. This permits efficient removal of the condensed water. It is thus possible to obtain a catalyst layer which allows oxygen diffusibility to be maintained at a high level for an extended period of time so that the amount of an increase in activation overvoltage with time is small.

This is specifically described. If the porosity exceeds 20%, in an early stage of power generation oxygen easily reaches the three-phase interface (electrode reaction site) through the pores, and the power generating performance is relatively good. However, as time passes from the start of power generation, a large amount of condensed water is accumulated in the pores, thereby making it difficult to ensure that oxygen is supplied deep into the catalyst layer. As a result, the power generating performance sharply lowers at a certain point.

On the other hand, if the porosity is less than 2%, it is likely that oxygen diffusibility is impeded by condensed water. Hence, sufficient power generating performance cannot be obtained even in an early stage of power generation. The porosity is calculated from the area of the pores which is determined by taking images of a plurality of cross-sections of the cathode-side electrolyte membrane, catalyst layer and diffusion layer using, for example, a scanning electron microscope (SEM), and subjecting the obtained image data of the cross-sections to an image processing (binarization). The porosity is more preferably 10% or less.

Also, in a preferable embodiment of the invention, the catalyst layer is formed so that the greatest depth of the pores present at the interface with the diffusion layer from the aforementioned interface is equal to or less than 50% of the thickness of the catalyst layer. In this case, the condensed water accumulated in the pores of the cathode catalyst layer is easily removed. Also, the reaction surface area of the cathode catalyst used in the oxygen reduction reaction (normal electrode reaction of the cathode) and the oxidation reaction of crossover methanol becomes uniform over the whole region of the catalyst layer. It is thus possible to obtain a direct oxidation fuel cell with high power density.

Also, in another preferable embodiment of the invention, the catalyst layer is formed so that the greatest width of the pores in the direction parallel to the interface with the electrolyte membrane is equal to or less than the thickness of the electrolyte membrane. This prevents the electrode reaction of the cathode from becoming uneven due to a large defect of the cathode catalyst layer. It is thus possible to keep the cathode overvoltage low stably.

Also, in a still another preferable embodiment of the invention, the cathode catalyst layer is formed so that the thickness thereof is 20 to 70 μm. In this case, the supply of oxygen deep into the catalyst layer and the removal of water from the depths of the catalyst layer are constantly facilitated, so that deterioration of the catalyst layer can be suppressed. The reason is as follows. If the thickness of the cathode catalyst layer exceeds 70 μm, it is likely that maintaining air diffusibility and water removal is difficult. On the other hand, if the thickness of the cathode catalyst layer is less than 20 μm, it is likely that securing the reaction area of the catalyst without lowering the porosity of the catalyst layer is difficult. The more preferable thickness of the cathode catalyst layer is 30 to 40 μm. If the thickness of the catalyst layer exceeds 40 μm, deterioration of durability becomes evident although initial performance is good.

Also, in a preferable embodiment of the invention, the amount of the catalyst in the catalyst layer per projected unit area is 0.6 to 1.6 mg/cm$^2$. The amount of the catalyst is more preferably 0.8 to 1.4 mg/cm$^2$. If the amount of the catalyst is less than 0.8 mg/cm$^2$, the catalyst reaction decreases. If the amount of the catalyst exceeds 1.4 mg/cm$^2$, the thickness of the catalyst layer increases and the porosity decreases, so that oxygen diffusibility deteriorates.

Embodiment 1

Referring now to drawings, the membrane-electrode assembly for a direct oxidation fuel cell according to Embodiment 1 of the invention is described. FIG. 1 is a sectional view schematically showing the structure of a unit cell using the membrane-electrode assembly of Embodiment 1 of the invention.

A unit cell 1 includes a laminar membrane-electrode assembly (hereinafter "MEA") 5 composed of an electrolyte membrane 2, an anode 3 bonded to one face of the electrolyte membrane 2, and a cathode 4 bonded to the other face of the electrolyte membrane 2. In the unit cell 1, an anode-side separator 6 is disposed on the outer side of the anode 3 of the MEA 5, and a cathode-side separator 7 is disposed on the outer side of the cathode 4.

The anode 3 includes an anode catalyst layer 8 formed on the electrolyte membrane 2 and an anode diffusion layer 9 formed on the anode catalyst layer 8. The anode diffusion layer 9 of the anode 3 is in contact with the anode-side separator 6.

Also, the cathode 4 includes a cathode catalyst layer 10 formed on the electrolyte membrane 2 and a cathode diffusion layer 11 formed on the cathode catalyst layer 10. The cathode diffusion layer 11 of the cathode 4 is in contact with the cathode-side separator 7.

The anode-side separator 6 has, on the face facing the anode diffusion layer 9, a flow channel 22 for supplying a fuel and discharging unused fuel and reaction products. The cathode-side separator 7 has, on the face facing the cathode diffusion layer 11, a flow channel 23 for supplying an oxidant and discharging unused oxidant and a reaction product.

Also, gaskets 20 and 21 are disposed around the anode 3 and the cathode 4, respectively, to prevent the fuel, oxidant, and reaction products from leaking out of the anode 3 and cathode 4.

The anode-side separator 6 and the cathode-side separator 7 are sandwiched with current collector plates 12 and 16, sheet heaters 13 and 17, insulator plates 14 and 18, and end plates 15 and 19 in this order. All the constituent components of the unit cell 1 are integrally secured with clamping means (not shown).

It is preferable that the electrolyte membrane 2 be excellent in proton conductivity, heat resistance, and chemical stability. Hence, the polymer electrolyte which is the material constituting the electrolyte membrane 2 is not particularly limited if it allows the electrolyte membrane 2 to have such characteristics.

Each of the anode catalyst layer 8 and the cathode catalyst layer 10 is composed mainly of: metal fine particles serving as the catalyst, or carbon particles carrying catalyst metal fine particles; and a polymer electrolyte. The catalyst of the anode catalyst layer 8 can be, for example, fine particles of a Pt(platinum)-Ru(ruthenium) alloy. The catalyst of the cathode catalyst layer 10 can be, for example, Pt fine particles. The weight of Pt contained in the cathode catalyst layer 8 per projected unit area is preferably 0.6 to 1.6 mg/cm$^2$, and more preferably 0.8 to 1.4 mg/cm$^2$. Also, it is preferable that the polymer electrolyte contained in each of the catalyst layers 8 and 10 be the same as the material constituting the electrolyte membrane 2.

The anode diffusion layer 9 is formed of a conductive porous substrate which allows fuel to be diffused and carbon dioxide produced by power generation to be removed therethrough while having electronic conductivity. Examples of such conductive porous substrates include carbon paper and carbon cloth. Also, such a conductive porous substrate may be subjected to a water-repellent treatment by a known method. Further, a water-repellent carbon layer (not shown) may be formed on the surface of the conductive porous substrate of the anode diffusion layer 9 on the anode catalyst layer 8 side.

The cathode diffusion layer 11 is formed of a conductive porous substrate which allows air to be diffused and water produced by power generation to be removed therethrough while having electronic conductivity. Examples of such conductive porous substrates include carbon paper and carbon cloth. Also, such a conductive porous substrate may be subjected to a water-repellent treatment by a known method. Further, a water-repellent carbon layer (not shown) may be formed on the surface of the conductive porous substrate of the cathode diffusion layer 11 on the cathode catalyst layer 10 side.

The anode-side separator 6 and the cathode-side separator 7 are formed of a material having gas tightness, electronic conductivity, and electrochemical stability. The material is not particularly limited if it has such characteristics. Also, the shape of the flow channels 22 and 23 is not particularly limited if they can perform the aforementioned functions.

Also, the current collector plates 12 and 16, heaters 13 and 17, insulator plates 14 and 18, and end plates 15 and 19 can be formed of known materials.

Figure 2:
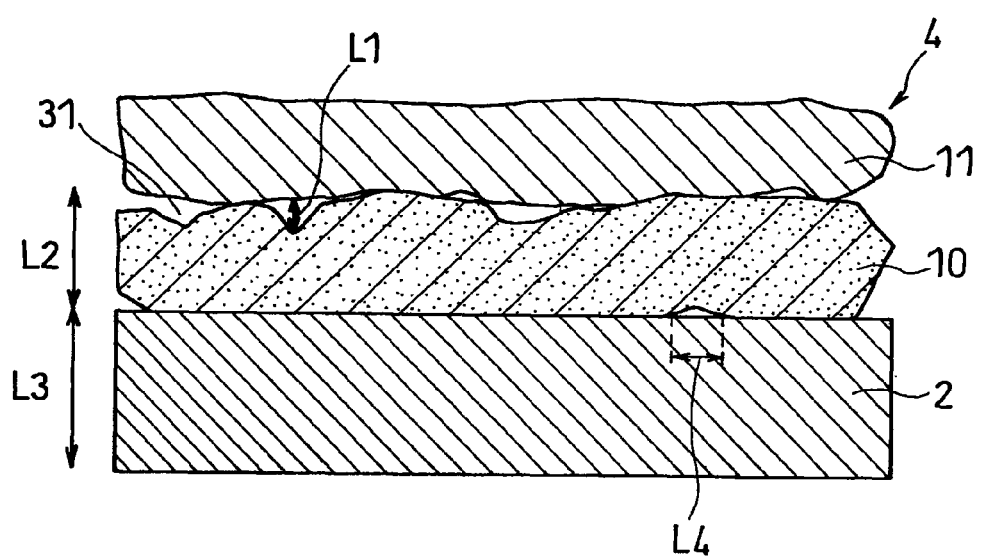
FIG. 2 is a longitudinal sectional view of the main part of the membrane-electrode assembly of FIG. 1.

FIG. 2 illustrates the cathode 4 in details. As described above, the cathode 4 is composed of the cathode catalyst layer 10 and the cathode diffusion layer 11. Pores 31 are present inside the cathode catalyst layer 10 (gaps between the secondary particles of the catalyst), at the interface between the cathode catalyst layer 10 and the cathode diffusion layer 11, and at the interface between the cathode catalyst layer 10 and the electrolyte membrane 2. The cathode catalyst layer 10 is formed so that the porosity (the ratio of the total volume of the pores 31 to the total volume of the portion between the cathode diffusion layer 11 and the electrolyte membrane 2) is 2 to 20%.

Further, the cathode catalyst layer 10 is formed so that the greatest depth L1 of the pores 31 present at the interface with the cathode diffusion layer 11 is equal to or less than 50% of the thickness L2 of the cathode catalyst layer 10.

Also, the cathode catalyst layer 10 is formed so that the greatest width L4 of the pores 31 in the direction parallel to the interface with the electrolyte membrane 2 is equal to or less than the thickness L3 of the electrolyte membrane 2.

Also, the cathode catalyst layer 10 is formed so that the thickness L2 thereof is 10 to 80 μm, and more preferably 20 to 70 μm.

Figure 3:
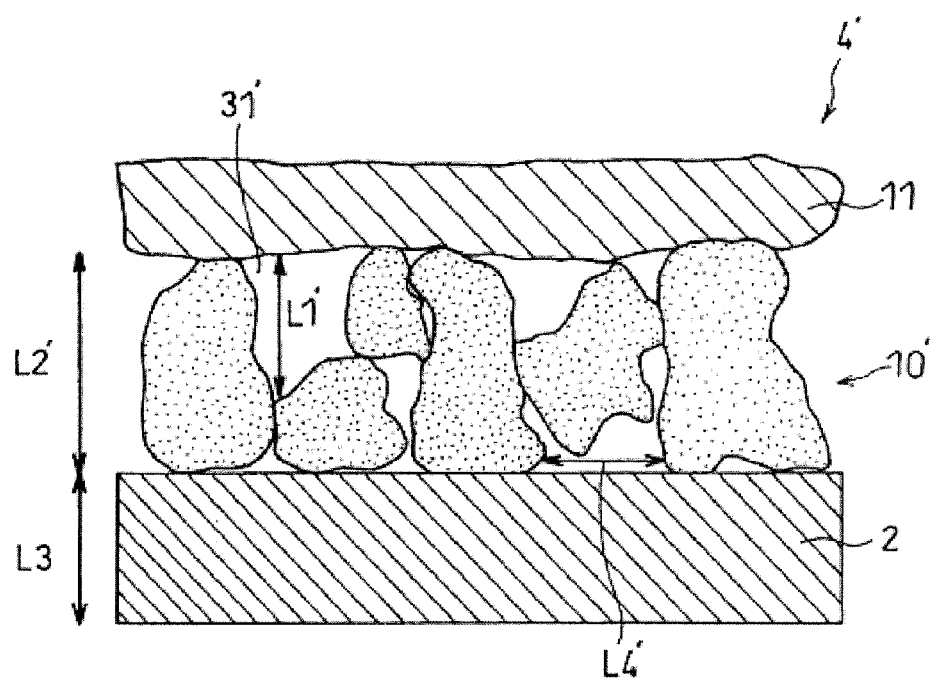
FIG. 3 is a longitudinal sectional view of a comparative example for the membrane-electrode assembly of FIG. 2.
Figure 4:
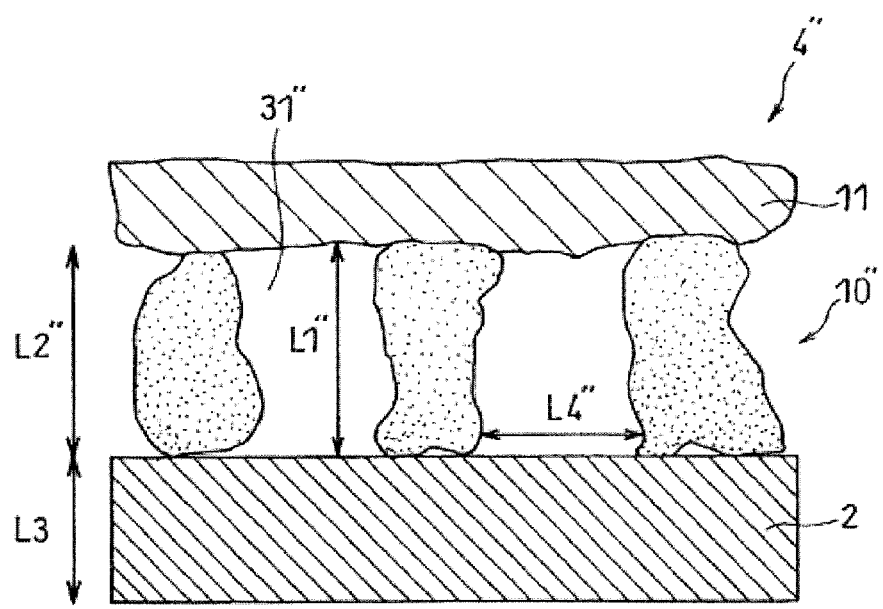
FIG. 4 is a longitudinal sectional view of another comparative example for the membrane-electrode assembly of FIG. 2.

The cathode catalyst layer 10 of Embodiment 1 has the above-described configuration for the following reasons. FIG. 3 and FIG. 4 illustrate cathodes 4' and 4" as comparative examples for the membrane-electrode assembly of FIG. 2. In the cathode 4' of FIG. 3, the porosity of a cathode catalyst layer 10' exceeds 20%. In an early stage of power generation, through pores 31' of the cathode catalyst layer 10', oxygen serving as the oxidant easily reaches the three-phase interface (electrode reaction site). Thus, the power generating performance is relatively good in an early stage of power generation. However, as the power generation time passes, a large amount of condensed water is accumulated in the pores 31', thereby making it difficult to ensure that oxygen is supplied deep into the cathode catalyst layer 10', i.e., into the vicinity of the electrolyte membrane 2.

Also, the cathode 4" of FIG. 4 is a comparative example in which the greatest width L4" of pores 31" of a cathode catalyst layer 10" exceeds the thickness L3 of the electrolyte membrane 2. Since the cathode catalyst layer 10" has such a large defect, the electrode reaction in the cathode catalyst layer 10" becomes uneven. As a result, the overvoltage of the cathode increases and the durability lowers significantly.

Contrary to this, in the cathode 4 of FIG. 2, the porosity of the cathode catalyst layer 10 is 20% at the maximum. Since the ratio of the pores 31 in the cathode catalyst layer 10 (porosity) is small, the evenness of the electrode reaction can be enhanced over the whole region of the catalyst layer 10. Further, in the cathode 4 of FIG. 2, a large amount of condensed water is not accumulated and, in addition, since the amount of the pores 31 is small, the condensed water is discharged into the flow channel 23 through the pores of the cathode diffusion layer 11 at short intervals. This permits efficient removal of the condensed water from the cathode. As a result, oxygen diffusibility is secured for an extended period of time and durability can be dramatically improved.

Figure 5:
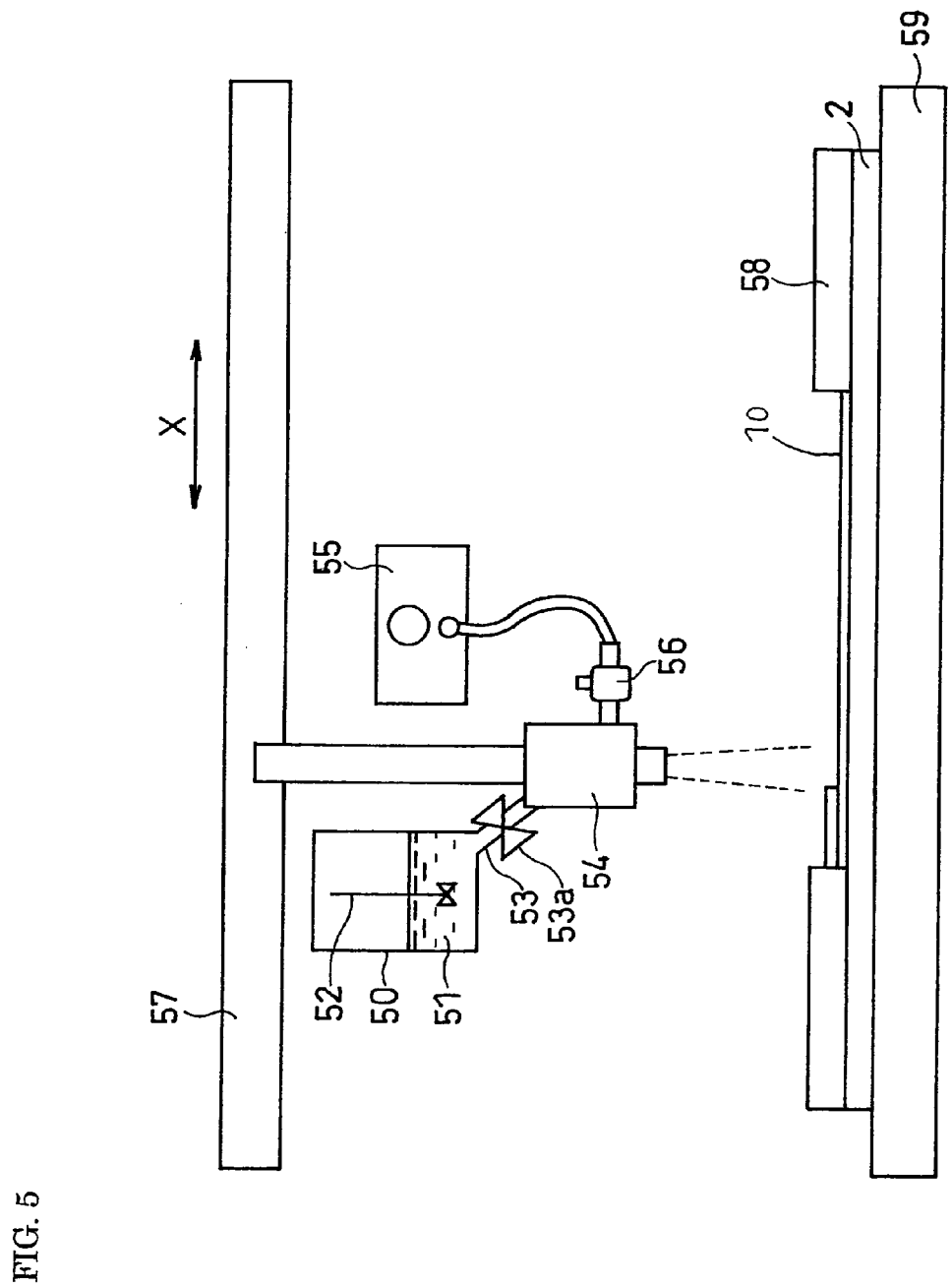
FIG. 5 is a schematic view of a spray coater used to form the cathode catalyst layer of FIG. 1.

Referring now to FIG. 5, the method of forming a cathode catalyst layer is described. FIG. 5 is a schematic view of a spray coater for forming a cathode catalyst layer.

In the spray coater of FIG. 5, a catalyst-containing ink (hereinafter "catalyst ink") 51 is stored in a tank 50. The catalyst ink 51 is constantly stirred by a stirring device 52 in the tank 50. The catalyst ink 51 in the tank 50 is fed to a spray gun 54 through a supply pipe 53 equipped with a valve 53a.

The catalyst ink 51 fed to the spray gun 54 is sprayed from the spray gun 54 together with an ink spray gas fed to the spray gun 54 via a gas pressure adjustor 55 and a gas flow rate adjustor 56. The ink spray gas can be, for example, nitrogen gas.

Also, the spray gun 54 is moved to a desired position at a desired speed by an actuator 57 in two directions: the X axis (lateral direction) in FIG. 5 and the Y axis (not shown) perpendicular to the plane of the paper of FIG. 5.

The spray gun 54 is disposed above the electrolyte membrane 2 placed on a heater 59. By moving the spray gun 54 while causing it to spray the catalyst ink 51, the cathode catalyst layer 10 is formed on the electrolyte membrane 2. Also, the area of the electrolyte membrane 2 to which the catalyst ink 51 is to be applied is defined by a mask 58.

Also, in forming the cathode catalyst layer 10, the surface temperature of the electrolyte membrane 2 is adjusted by the amount of heating by the heater 59. It should be noted that FIG. 5 illustrates a process of forming the cathode catalyst layer 10 in which the catalyst ink 51 is sprayed from the spray gun 54.

The porosity of the cathode catalyst layer 10 and the greatest depth of the pores 31 present at the interface with the cathode diffusion layer 11 can be controlled, for example, by subjecting or not subjecting the catalyst ink 51 to an ultrasonic dispersion process immediately before spraying it with the spraying coater. If an ultrasonic dispersion process is applied, both the porosity and the greatest depth decrease.

Also, the porosity, the greatest depth, and the thickness of the cathode catalyst layer 10 can be controlled by adjusting the moving speed of the spray gun 54, the pressure and flow rate of the ink spray gas, and the surface temperature of the electrolyte membrane 2. In order to make the porosity of the catalyst layer low, it is desirable to make the moving speed of the spray gun 54 fast. It is also desirable to make the pressure and flow rate of the ink spray gas low, and make the surface temperature of the electrolyte membrane 2 high.

Also, in the case of forming the anode diffusion layer 9 and the cathode diffusion layer 10 by hot pressing as described later, it is desirable to make the temperature and the pressure high and make the pressing time long.

The invention is hereinafter described in detail based on Examples, but the invention is not to be construed as being limited to these Examples.

EXAMPLE 1

The cathode catalyst used was 50% by weight of Pt with a mean particle size of 3 nm carried on carbon black with a mean primary particle size of 30 nm (ketjen black EC available from Mitsubishi Chemical Corporation). The cathode catalyst was ultrasonically dispersed in an aqueous solution of isopropanol, and the resulting dispersion was mixed with an aqueous solution containing 5% by weight of a polymer electrolyte. The resulting liquid mixture was stirred with a disperser, to prepare a cathode catalyst ink.

The weight ratio of Pt to the polymer electrolyte in the cathode catalyst ink was set to 3:2. The polymer electrolyte used was a perfluorocarbon sulfonic acid ionomer (Flemion available from Asahi Glass Co., Ltd.).

Next, using the spray coater of FIG. 5, the cathode catalyst ink was applied directly onto an electrolyte membrane to form a cathode catalyst layer. The electrolyte membrane used was a perfluoroalkyl sulfonic acid ion-exchange membrane (Nafion 112 available from DuPont). The cathode catalyst layer was formed by reapplying the cathode catalyst ink 26 times in the thickness direction without ultrasonically dispersing it immediately before applying it. Specifically, the application interval of the cathode catalyst ink was set to 10 mm, and every time the ink was reapplied, the starting position of the application was shifted 1 mm in the direction of the X axis (offset amount 1 mm).

The moving speed of the spray gun for applying the cathode catalyst ink was set to 40 mm/sec, and the pressure for spraying the nitrogen gas (spray gas) was set to 0.20 MPa. Also, the surface temperature of the electrolyte membrane during the application of the cathode catalyst ink was set to 60° C.

The projected shape of the cathode catalyst layer had a size of 6 cm×6 cm, and the weight of Pt contained per projected unit area was 1.16 mg/cm$^2$.

The anode catalyst used was Pt—Ru alloy fine particles with a mean particle size of 3 nm (the weight ratio of Pt to Ru was 2:1). This catalyst was ultrasonically dispersed in an aqueous solution of isopropanol, and the resulting dispersion was mixed with an aqueous solution containing 5% of a polymer electrolyte. The resulting liquid mixture was highly dispersed in a bead mill to prepare an anode catalyst ink.

The weight ratio of the Pt—Ru alloy fine particles to the polymer electrolyte in the anode catalyst ink was set to 2:1. The polymer electrolyte used was a perfluorocarbon sulfonic acid ionomer (Flemion available from Asahi Glass Co., Ltd.).

Next, an anode catalyst layer was formed by a doctor blade process on the face of the electrolyte membrane opposite the face on which the cathode catalyst layer was formed, so that it paired off with the cathode catalyst layer. The projected shape of the anode catalyst layer had a size of 6 cm×6 cm, and the weight of the Pt—Ru alloy contained per projected unit area was 6.5 mg/cm$^2$.

The catalyst coated membrane assembly (CCM) thus obtained was sandwiched with an anode diffusion layer and a cathode diffusion layer, each of which had been cut to a projected shape of 6 cm×6 cm, in such a manner that the water-repellent carbon layers faced inward. This was hot pressed (temperature 130° C., pressure 4 MPa, pressing time 3 minutes).

The anode diffusion layer was prepared by forming a water-repellent carbon layer (PTFE content 40%) of approximately 30 μm in thickness on one face of a carbon paper (TGP-H090 available from Toray Industries Inc.). The cathode diffusion layer was a carbon cloth with a water-repellent carbon layer on one face (LT2500W available from BASF Fuel Cell, Inc.).

Further, the gaskets 20 and 21 were thermally bonded to the electrolyte membrane 2 around the anode and the cathode 12, respectively, so as to sandwich the electrolyte membrane 2, at a temperature of 140° C. and a pressure of 4 Mpa for 5 minutes, in order to produce a membrane-electrode assembly (MEA). The gaskets had a three-layer structure consisting of a polyetherimide layer (intermediate layer) sandwiched between silicone rubber layers.

The MEA thus produced was sandwiched between two separators, two current collector plates, two sheet heaters, two insulator plates, and two end plates, all of which had outer dimensions of 12 cm×12 cm. This was then secured by clamping rods. The clamping pressure was adjusted to 12 kgf/cm$^2$ per unit area of the separator. The two separators were prepared from a resin-impregnated graphite material of 4 mm in thickness (G347B available from TOKAI CARBON CO., LTD.). A serpentine flow channel having a width of 1.5 mm and a depth of 1 mm was formed on each of the separators.

The two current collector plates were gold-plated stainless steel plates. The two sheet heaters were SEMICON heaters (available from SAKAGUCHI E.H. VOC CORP.).

Unit cells prepared in the above manner were stacked to produce a direct oxidation fuel cell of Example 1.

EXAMPLE 2

The cathode catalyst layer was formed by reapplying the cathode catalyst ink 18 times in the thickness direction. The moving speed of the spray gun for applying the cathode catalyst ink was set to 30 mm/sec, and the pressure for spraying the nitrogen gas (spray gas) was set to 0.25 MPa. Also, the surface temperature of the electrolyte membrane during the application of the cathode catalyst ink was set to 55° C. The weight of Pt contained in the cathode catalyst layer per projected unit area was 1.25 mg/cm$^2$. Except for these, in the same manner as in Example 1, a direct oxidation fuel cell of Example 2 was produced.

EXAMPLE 3

The same cathode catalyst as that used in Example 1 was ultrasonically dispersed in an aqueous solution of isopropanol. Also, the cathode catalyst layer was formed by reapplying the cathode catalyst ink 35 times in the thickness direction. The moving speed of the spray gun for applying the cathode catalyst ink was set to 50 mm/sec, and the pressure for spraying the nitrogen gas (spray gas) was set to 0.15 MPa. Also, the surface temperature of the electrolyte membrane during the application of the cathode catalyst ink was set to 70° C. The weight of Pt contained in the cathode catalyst layer per projected unit area was 1.02 mg/cm$^2$. Except for these, in the same manner as in Example 1, a direct oxidation fuel cell of Example 3 was produced.

EXAMPLE 4

The same cathode catalyst as that used in Example 1 was ultrasonically dispersed in an aqueous solution of isopropanol. The cathode catalyst ink was ultrasonically dispersed for 10 minutes immediately before being applied, and this cathode catalyst ink was reapplied 46 times in the thickness direction to form the cathode catalyst layer. The weight of Pt contained in the cathode catalyst layer per projected unit area was 1.18 mg/cm$^2$. Except for these, in the same manner as in Example 1, a direct oxidation fuel cell of Example 4 was produced.

EXAMPLE 5

The same cathode catalyst as that used in Example 1 was ultrasonically dispersed in an aqueous solution of isopropanol. The cathode catalyst ink was ultrasonically dispersed for 30 minutes immediately before being applied, and this cathode catalyst ink was reapplied 73 times in the thickness direction to form the cathode catalyst layer. The pressure for spraying the nitrogen gas (spray gas) was set to 0.10 MPa. The weight of Pt contained in the cathode catalyst layer per projected unit area was 1.33 mg/cm. Except for these, in the same manner as in Example 1, a direct oxidation fuel cell of Example 5 was produced.

EXAMPLE 6

The same cathode catalyst as that used in Example 1 was ultrasonically dispersed in an aqueous solution of isopropanol. The cathode catalyst layer was formed by reapplying the cathode catalyst ink 20 times in the thickness direction. The pressure for spraying the nitrogen gas (spray gas) was set to 0.25 MPa. The weight of Pt contained in the cathode catalyst layer per projected unit area was 0.85 mg/cm$^2$. Except for these, in the same manner as in Example 1, a direct oxidation fuel cell of Example 6 was produced.

COMPARATIVE EXAMPLE 1

The same cathode catalyst as that used in Example 1 was ultrasonically dispersed in an aqueous solution of isopropanol. In order to make the cathode catalyst layer more porous, the cathode catalyst layer was formed by a doctor blade process in which the whole amount of the catalyst ink was applied at a uniform thickness and dried.

Specifically, the cathode catalyst layer was formed on a polymer film (Nafion PTFE sheet available from NICHIAS Corporation) by a doctor blade process. The polymer film with the cathode catalyst layer formed thereon was cut to a sheet of 6 cm×6 cm, and the sheet was placed on an electrolyte membrane in such a manner that the face with the cathode catalyst layer formed thereon faced the electrolyte membrane. This was hot pressed (temperature 130° C., pressure 7 MPa, pressing time 5 minutes), so that the cathode catalyst layer was bonded to the electrolyte membrane. Subsequently, only the polymer film was removed, to obtain a membrane-cathode catalyst layer assembly.

The electrolyte membrane used was a perfluoroalkyl sulfonic acid ion-exchange membrane (Nafion 112 available from DuPont).

The projected shape of the cathode catalyst layer had a size of 6 cm×6 cm, and the weight of Pt contained per projected unit area was 0.73 mg/cm$^2$. Except for these, in the same manner as in Example 1, a direct oxidation fuel cell of Comparative Example 1 was produced.

COMPARATIVE EXAMPLE 2

The same cathode catalyst as that used in Example 1 was ultrasonically dispersed in an aqueous solution of isopropanol. The cathode catalyst layer was formed by reapplying the cathode catalyst ink 15 times in the thickness direction. The moving speed of the spray gun for applying the cathode catalyst ink was set to 30 mm/sec, and the pressure for spraying the nitrogen gas (spray gas) was set to 0.30 MPa. Also, the surface temperature of the electrolyte membrane during the application of the cathode catalyst ink was set to 40° C. Except for these, in the same manner as in Example 1, a direct oxidation fuel cell of Comparative Example 2 was produced.

COMPARATIVE EXAMPLE 3

The same cathode catalyst as that used in Example 1 was ultrasonically dispersed in an aqueous solution of isopropanol. The cathode catalyst layer was formed by reapplying the cathode catalyst ink 42 times in the thickness direction. The moving speed of the spray gun for applying the cathode catalyst ink was set to 60 mm/sec, and the pressure for spraying the nitrogen gas (spray gas) was set to 0.10 MPa. Also, the surface temperature of the electrolyte membrane during the application of the cathode catalyst ink was set to 70° C. The weight of Pt contained in the cathode catalyst layer per projected unit area was 0.91 mg/cm$^2$. Except for these, in the same manner as in Example 1, a direct oxidation fuel cell of Comparative Example 3 was produced.

COMPARATIVE EXAMPLE 4

The same cathode catalyst as that used in Example 1 was ultrasonically dispersed in an aqueous solution of isopropanol.

Next, the cathode catalyst layer was formed on a polymer film (Nafion PTFE sheet available from NICHIAS Corporation) by a doctor blade process. The polymer film with the cathode catalyst layer formed thereon was cut to a sheet of 6 cm×6 cm, and the sheet was placed on an electrolyte membrane in such a manner that the face with the cathode catalyst layer formed thereon faced the electrolyte membrane. This was hot pressed (130° C., 7 MPa, 5 minutes), so that the cathode catalyst layer was bonded to the electrolyte membrane. Subsequently, only the polymer film was removed, to obtain a membrane-cathode catalyst layer assembly.

The electrolyte membrane used was a perfluoroalkyl sulfonic acid ion-exchange membrane (Nafion 112 available from DuPont).

The projected shape of the cathode catalyst layer had a size of 6 cm×6 cm, and the weight of Pt contained per projected unit area was 1.43 mg/cm$^2$. Except for these, in the same manner as in Example 1, a direct oxidation fuel cell of Comparative Example 4 was produced.

Using the direct oxidation fuel cells of Examples 1 to 6 and Comparative Examples 1 to 4 (hereinafter referred to as "test cells"), the porosity of the cathode catalyst layer, the greatest depth of the pores present at the interface between the cathode diffusion layer and the cathode catalyst layer, the greatest width of the pores in the direction parallel to the aforementioned interface, and the thickness of the cathode catalyst layer were measured by the following methods.

Specifically, the MEA of each test cell was cut, impregnated with epoxy resin, wet ground with sandpaper, and polished to a mirror-smooth state with a buffing cloth (impregnated with an alumina emulsion). Images of ten cross-sections of the electrolyte membrane, the cathode catalyst layer, and the cathode diffusion layer were taken using a scanning electron microscope (S4500 available from Hitachi, Ltd.). The image data were subjected to an image processing (binarization) to calculate the porosity of the cathode catalyst layer.

Also, the greatest depth and greatest width of the pores and the thickness of the cathode catalyst layer were also determined based on the image data obtained using the scanning electron microscope.

The durability of each test cell was evaluated. The evaluation method is as follows.

An aqueous solution of 4 M (mol/l) methanol was supplied to the anode at a flow rate of 0.27 cc/min while air was supplied to the cathode at a flow rate of 0.26 L/min. The temperature of the fuel cell was kept at 60° C. The test cell was operated to continuously generate power at a constant voltage (0.4 V). From the current density value upon the passage of 4 hours from the start of power generation, the power density value was calculated, and the calculated value was defined as initial power density.

Also, from the current density value upon the passage of 1000 hours from the start of power generation, the power density value was calculated, and the ratio of the calculated value to the initial power density was defined as power density retention rate.

The above results are shown in Table 1. With respect to the item "Greatest depth of pores" in Table 1, the symbol "o" indicates that the greatest depth of the pores present at the interface between the cathode diffusion layer 11 and the cathode catalyst layer is equal to or less than 50% of the thickness of the cathode catalyst layer, and the symbol "x" indicates that it is more than 50%.

Also, with respect to the item "Greatest width of pores", the symbol "o" indicates that the greatest width of the pores is equal to or less than the thickness of the electrolyte membrane, and the symbol "x" indicates that it is more than the thickness of the electrolyte membrane.

TABLE 1

|  | Cathode catalyst layer | | | | Durability | |
| --- | --- | --- | --- | --- | --- | --- |
|  | Porosity [%] | Greatest depth of pores | Greatest width of pores | Thickness [μm] | Amount of catalyst [mg/cm$^2$] | Initial power density [mW/cm$^2$] | Power density retention rate [%] |
| Example 1 | 10 | o | o | 30 | 1.16 | 80 | 98 |
| Example 2 | 18 | x | o | 30 | 1.25 | 74 | 93 |
| Example 3 | 2 | o | o | 30 | 1.02 | 71 | 97 |
| Example 4 | 10 | o | o | 60 | 1.18 | 73 | 95 |
| Example 5 | 10 | o | o | 80 | 1.33 | 68 | 90 |
| Example 6 | 10 | o | o | 15 | 0.85 | 65 | 92 |
| Comparative Example 1 | 40 | x | x | 30 | 1.21 | 73 | 54 |
| Comparative Example 2 | 28 | x | o | 30 | 1.27 | 71 | 65 |
| Comparative Example 3 | 1 | o | o | 30 | 1.09 | 64 | 74 |
| Comparative Example 4 | 40 | x | x | 60 | 1.24 | 66 | 31 |

As shown in Table 1, the power density retention rates of Examples 1 to 6 were very high. This result indicates that in Examples 1 to 6, the defect of the cathode catalyst layer is reduced and that the evenness of the electrode reaction is high over the whole region of the catalyst layer. In the case of Example 2, although the greatest depth of the pores is large, the greatest width of the pores is small, so the porosity of the cathode catalyst layer is also low.

In Examples 1 to 6, since the ratio of the pores in which condensed water is accumulated to the cathode catalyst layer (porosity) is low, a large amount of condensed water is not accumulated in the cathode catalyst layer. Also, since the porosity is low, the pressure exerted on condensed water rises at short intervals, allowing the condensed water to be discharged into the oxidant flow channel through the pores of the cathode diffusion layer. This permits efficient removal of the condensed water from the cathode. This is probably the reason why it was possible to obtain cathode catalyst layers allowing oxygen diffusibility to be maintained at a high level over an extended period of time so that the amount of an increase in overvoltage is small.

Also, of Examples 1 to 6, Examples 1, 3, and 4 exhibit significantly improved durability. In these fuel cells, the greatest depth of the pores is equal to or less than 50% of the thickness of the cathode catalyst layer. Hence, the condensed water accumulated in the pores of the cathode catalyst layer is easily discharged and, in addition, the reaction surface area of the cathode catalyst used in the oxygen reduction reaction (normal electrode reaction of the cathode) and the oxidation reaction of crossover methanol becomes uniform over the whole region of the catalyst layer. These are probably the reasons of the improved durability.

Also, in Examples 1, 3, and 4, the greatest width of the pores is equal to or less than the thickness of the electrolyte membrane. Probably for this reason, it was possible to prevent the electrode reaction from becoming uneven due to a large defect of the cathode catalyst layer. Further, the thickness of the cathode catalyst layer is adjusted in the suitable range of 20 to 70 μm. This is probably the reason why the supply of oxygen deep into the catalyst layer and the removal of water from the depths of the catalyst layer were constantly facilitated. In the case of Examples 5 and 6, in which the thickness of the cathode catalyst layer is outside the range of 20 to 70 μm, the durability was lower than that of Examples 1, 3, and 4 probably for the above-stated reasons.

Contrary to this, Comparative Examples 1, 2, and 4 exhibited significantly lower power density retention rates than Examples 1 to 6. In these Comparative Examples, the porosity of the cathode catalyst layer exceeds 20%. Hence, in an early stage of power generation, oxygen can easily reach the three-phase interface (electrode reaction site) through the pores, so the power generating performance becomes relatively good. However, as the power generation time passes, a large amount of condensed water is accumulated in the pores, thereby making it difficult to ensure that oxygen is supplied deep into the catalyst layer. This is probably the reason why the durability deteriorated.

Also, in the case of Comparative Example 3, the initial power density was low, and the power density retention rate was also lower than those of Examples 1 to 6. The ratio of the pores present in the cathode catalyst layer of Comparative Example 3 is less than 2%. Probably for this reason, oxygen diffusibility was impeded by condensed water.

The direct oxidation fuel cell of the invention has excellent power generating performance and durability. Thus, it is useful, for example, as the power source for portable small-size electronic devices such as cellular phones, notebook personal computers, and digital still cameras. Further, the direct oxidation fuel cell of the invention is applicable to the power source for electric scooters, automobiles, etc.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A membrane-electrode assembly for a direct oxidation fuel cell, comprising an electrolyte membrane, and an anode and a cathode sandwiching said electrolyte membrane, wherein:
   the cathode comprises a catalyst layer in contact with the electrolyte membrane and a diffusion layer sandwiching the catalyst layer with the electrolyte membrane,
   the catalyst layer has a volume V1 and contains pores having a volume v1,
   pores having a controllable volume v2 are present between the electrolyte membrane and the catalyst layer,
   pores having a controllable volume v3 are present between the diffusion layer and the catalyst layer,
   where (v1+v2+v3)/(V1+v1+v2+v3) is 2 to 20%,
   the amount of a catalyst in the catalyst layer per unit area of a projected shape of the catalyst layer is 0.6 to 1.6 mg/cm$^2$, and
   the thickness of the catalyst layer is 20 to 70 μm.

2. The membrane-electrode assembly in accordance with claim 1, wherein the greatest depth of the pores present between the diffusion layer and the catalyst layer from the interface between the catalyst layer and the diffusion layer toward the catalyst layer is equal to or less than 50% of the thickness of the catalyst layer.

3. The membrane-electrode assembly in accordance with claim 1, wherein the greatest width of the pores present between the catalyst layer and the electrolyte membrane in the direction parallel to the interface between the catalyst layer and the electrolyte membrane is equal to or less than the thickness of the electrolyte membrane.

4. A direct oxidation fuel cell including at least one unit cell, the unit cell comprising:
   the membrane-electrode assembly of claim 1;
   an anode-side separator having a fuel flow channel for supplying a fuel to the anode; and
   a cathode-side separator having an oxidant flow channel for supplying an oxidant to the cathode.

* * * * *